United States Patent [19]

Harburg

[11] Patent Number: 5,040,948
[45] Date of Patent: Aug. 20, 1991

[54] COAXIAL MULTI-TURBINE GENERATOR

[76] Inventor: Rudy W. Harburg, 1020 Mapleton Ave., Boulder, Colo. 80302

[21] Appl. No.: 499,170

[22] Filed: Mar. 26, 1990

[51] Int. Cl.$^5$ ............................................. F03D 11/00
[52] U.S. Cl. ................................. 416/85; 416/132 B; 416/195; 416/240
[58] Field of Search ............... 416/132 A, 196 A, 195, 416/132 B, 240 A, 85; 290/44, 54, 55

[56] References Cited

U.S. PATENT DOCUMENTS

| | | | |
|---|---|---|---|
| 4,084,102 | 4/1978 | Fry et al. | 416/119 X |
| 4,087,990 | 5/1978 | Gillette | 416/196 A X |
| 4,151,424 | 4/1979 | Bailey | 416/132 B X |
| 4,191,507 | 3/1980 | DeBerg | 416/132 B X |
| 4,217,501 | 8/1980 | Allison | 416/132 B X |
| 4,276,033 | 6/1981 | Krovina | 416/240 A |
| 4,491,739 | 1/1985 | Watson | 290/55 X |
| 4,572,962 | 2/1986 | Shepard | 290/44 X |
| 4,659,940 | 4/1987 | Shepard | 290/44 X |
| 4,685,642 | 8/1987 | Schloss | 244/153 A |
| 4,708,592 | 11/1987 | Krolick et al. | 416/196 A X |
| 4,730,119 | 3/1988 | Biscomb | 290/44 X |

FOREIGN PATENT DOCUMENTS

| | | | |
|---|---|---|---|
| 43945 | 3/1931 | Denmark | 290/55 |
| 3100085 | 12/1982 | Fed. Rep. of Germany | 290/55 |

*Primary Examiner*—Edward K. Look
*Assistant Examiner*—James A. Larson

[57] ABSTRACT

Turbines are suspended coaxially between a hub structure and a pivot. The hub acts to stabilize the coaxial turbine system and it acts as the power take off. The pivot acts to stabilize the other end of the coaxial turbine system. A coaxial assembly of unique flexible turbines convert wind energy into rotational mechanical energy. Driver lines attached to the extremities of the turbines transmit this energy to the extremities of the hub structure. The hub imparts torque to a drive shaft at its center thorough a moment arm and the drive shaft supplies power to a useful application, such as generating electricity. The coaxial turbine system is suspended from tower to tower between existing power transmission lines. Electricity generated by this system is fed directly into the existing power distribution system. This coaxial generator system utilizes a variety of turbine configurations and can be suspended in the wind in a number of ways.

20 Claims, 6 Drawing Sheets

COAXIAL MULTI-TURBINE GENERATOR

BACKGROUND

1. Field of Invention

This invention relates to an improved system for converting wind energy into rotational mechanical energy and to efficiently transmitting this energy to a rotating hub or shaft.

2. Discussion of Prior Art

Wind mills and turbine systems have been used to convert wind energy to useful mechanical and electrical energy for many years. Currently wind energy provides a small input to the energy consumption of the world. The direct cost of producing usable energy via available wind systems far exceeds the direct costs of competing systems for most applications. Currently available wind systems are expensive to manufacture and maintain, relative to their energy output and they are not as reliable or predictable as, for example, fuel burning systems. My invention uses a multiplicity of inexpensive coaxial turbines to generate and transmit power through a unique power take off system to a single electrical generator. This is much less expensive than having one or two wind turbines run a generator. The power output to cost ratio is thereby greatly improved. This invention also solves one of the most serious problems that has limited conventional wind turbines. Large diameter turbines are favored for their economy of scale, however beyond a point the structural requirements for supporting long turbine blades radiating from one central hub become prohibitive. This unique multi turbine coaxial system solves this problem by supporting the turbines at their extremities and at intermediate points along each turbine blade. Others have sought to invent economical wind energy systems employing the idea of a coaxial turbine system. The two inventions that best represent the state of the art are described in U.S. Pat. No. 4,084,102 by Fry et al and in U.S. Pat. No. 4,708,592 by Krolick et al. However in the Fry invention the power generated by the coaxial turbines is transmitted by torquing a central, relatively flexible drive shaft much like a drain snake but without the lateral support of a drain pipe. Relatively little power can be transmitted through a long unguided relatively flexible drive shaft before it tends to kink, shorten, or slap itself into loops. Krolick favors a flexible helicoidal turbine which generates and transmits power. There is no provision for the power generated in this coaxial systems to be transmitted by anything other than a twisting motion at its take off point of connection. Consequently like the Krolick device the helecoidal Fry device will yield very small amounts of power relative to its cost and size.

OBJECTIVES

The objectives and advantages of my invention are first, to provide a wind energy conversion system whose turbines do not fatigue and fail as easily as do previous art turbine blades that emanate unsupported from a central attachment point, second to provide a coaxial wind energy system that has the inherent capability of delivering a substantial flow of power relative to its size and cost unlike previous art coaxial devices that transmit power by twisting around a central cable or centroid, and finally to provide a system whose inherent design makes it possible to convert wind energy to mechanical or electrical energy at a cost directly competitive with energy systems fueled by fossil or nuclear fuel. Further objectives and advantages of my invention will become apparent from the ensuing drawings and descriptions.

DESCRIPTION OF INVENTION

Figure 2:
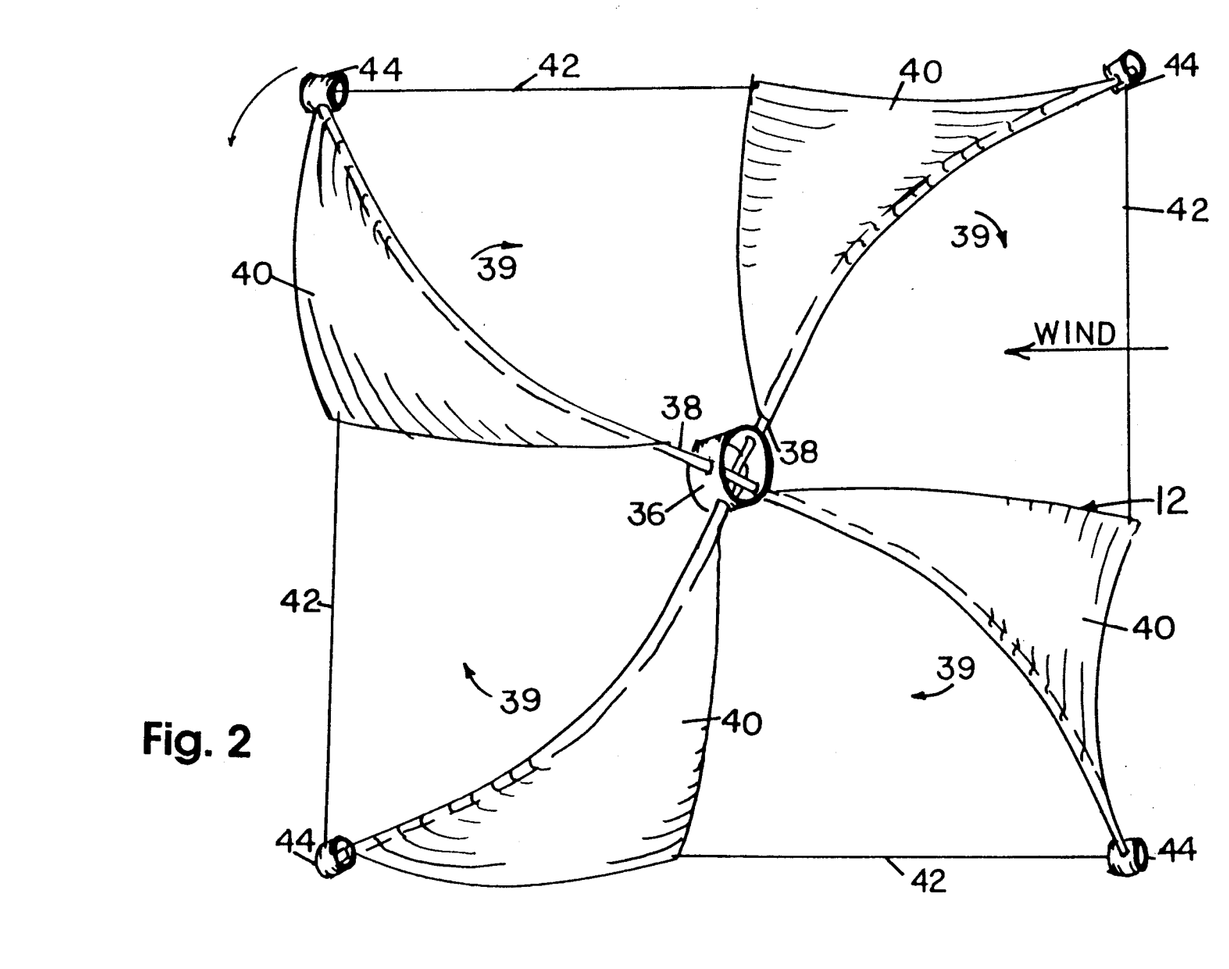
FIG. 2 is a perspective detail of one type of turbine means that can be used for energy conversion.

FIG. 2 illustrates one configuration of a turbine used to convert wind energy to rotational energy in order to power the coaxial system. Central Turbine Hub 36 serves as the central attachment point and crossing point for two turbine spars 38. Each flexible turbine blade 40 is attached to one end of a turbine spar 38 as shown and tethered to an adjacent spar by turbine blade tethers 42. Tether Attachment hub 44 serves as a useful way to attach tethers to spars and to attach the turbine to the parallel lines or cables of the coaxial system. Hubs 36 and 44 could be any kind of hub but in practice it is found to be quick and economical to cut them out of sections of pipe.

Figure 3:
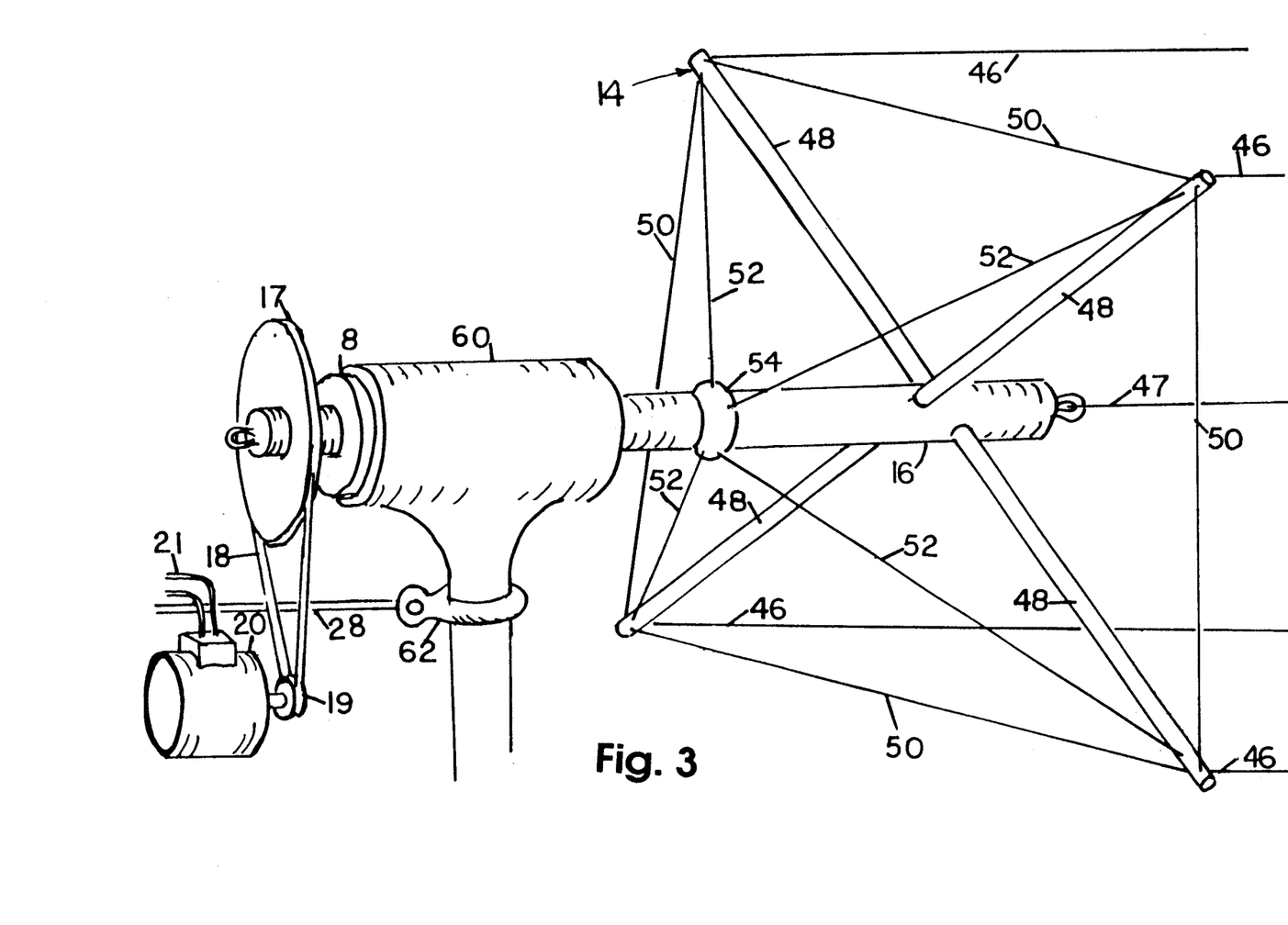
FIG. 3 is a perspective detail of a stabilizing frame assemble used as a power take off hub.

FIG. 3 illustrates a stabilizing frame assembly used as the power take hub off for the coaxial generating system. Drive shaft 16 is supported and held in place by stationary support 60 and thrust bearing 58. Stabilizer frame masts 48 are attached through drive shaft 16, and these masts are guyed by lateral guys 50 and back guys 52. Driver lines 46 are lines or cables attached at the extremities of these masts. In practice it is important to reinforce these attachment points with sleeves, hubs, or the like. Coaxial suspender line 47 is a line or cable that is attached coaxially to drive shaft 16. Pulley wheel 17 is attached to drive shaft 16. Pulley belt 18 runs from pulley wheel 17 to pulley wheel 19. Pulley wheel 19 is attached to electrical generator 20 which transmits electrical power through conductor cables 21 to some useful application.

Figure 4:
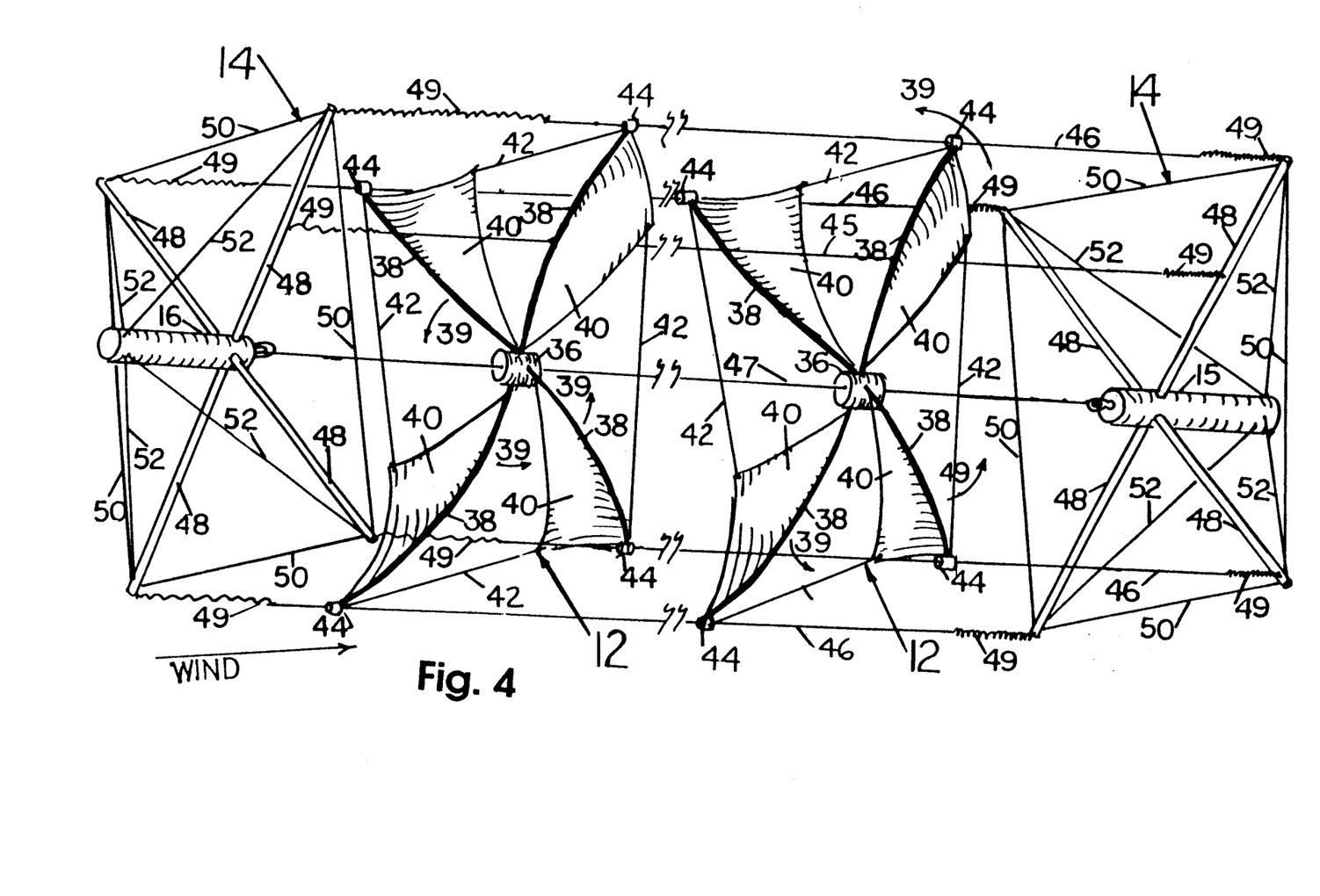
FIG. 4 is a perspective view showing the coaxial arrangement of stabilizer frames and turbines.

FIG. 4 shows the coaxial arrangement of the drive shaft 16, the secondary rotating shaft 15, the stabilizer frame assemblies, and the turbines. Drive shaft 16, coaxial suspender cable 47, the hubs of the turbines 36, and secondary rotating shaft 15 are all aligned coaxially and interconnected as shown. Driver lines 46 run parallel to suspender line 47. Lines 46 are attached to the extremities of mast 48 and spars 38 of the turbines. In practice it is useful to construct short section of lines 46 out of elastic material where they attach to masts 48. These are shown as elastic driver links 49. FIG. 4 shows the turbines secured at their hubs 36 to suspender line 47.

Figure 1:
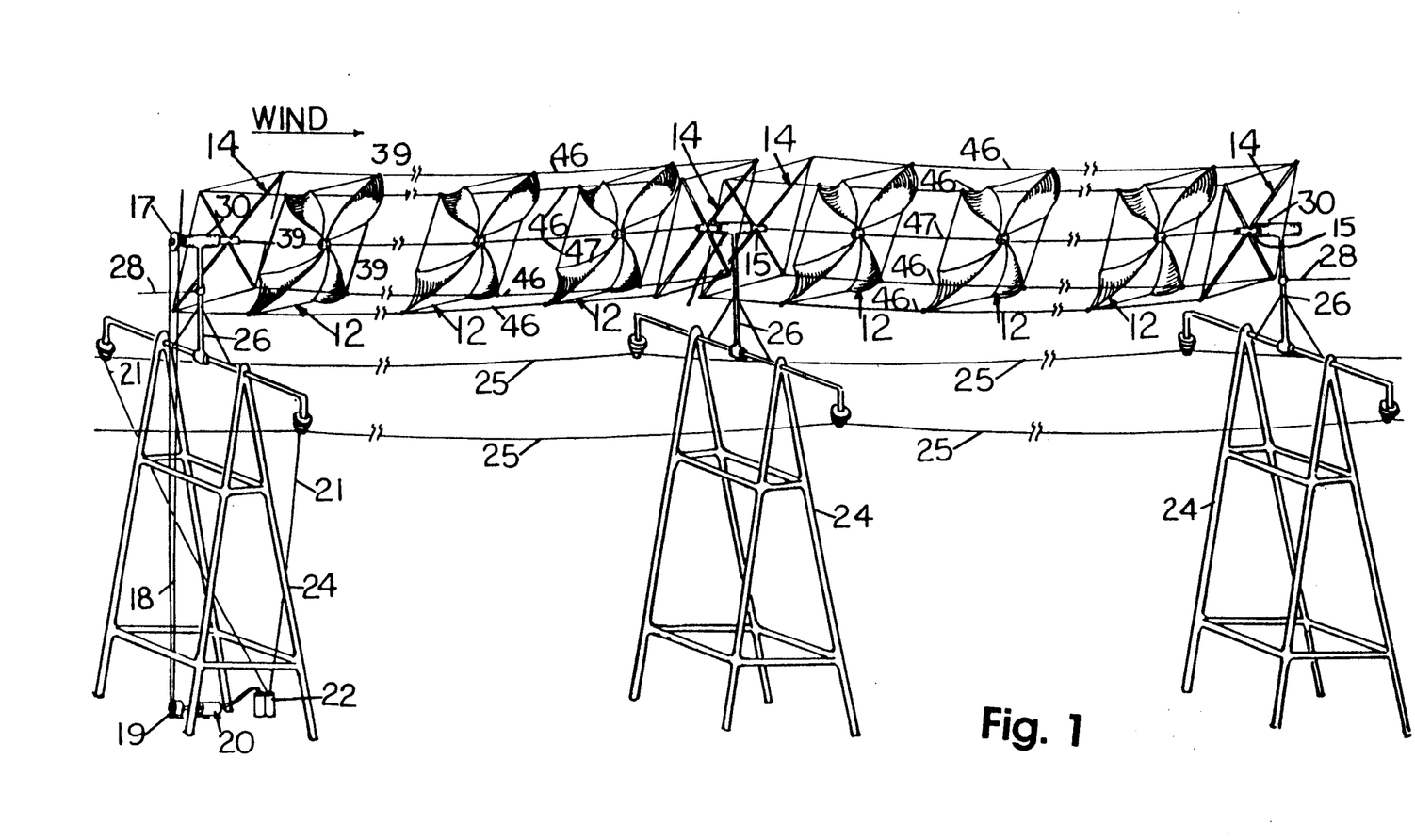
FIG. 1 is a perspective view of a preferred embodiment of the invention utilizing existing power transmission towers for support and elevation.

FIG. 1 is a perspective view of a preferred embodiment of my invention using pre-existing electrical transmission towers 24 for support and elevation. Tower extensions 26 are added to the towers as needed to keep moving parts from touching existing transmission lines 25. Drive shaft 16, rigid stabilizer assemblies 14, turbine assemblies 12, secondary rotating shafts 15, and suspender line 47 are all arranged coaxially as shown. They are supported by support bearings 30 and intermediate support bearing 31 which are attached to the tower extensions 26. Driver cables 46 are attached to the extremities of stabilizer assemblies 14 and turbines 12. Lines 46 are discontinous as shown at intermediate support bearing 31 and power is transmitted through a shaft 15. FIG. 4 shows the attachment of lines 46 in more detail. Pulley wheel 17 is attached to drive shaft 16 and pulley belt 18 runs from wheel 17 to wheel 19. Pulley wheel 19 is attached to generator 20 by its shaft, and generator 20 is electrically connected to transformer/inverter 22 through conductor cables 21. Transformer/inverter 22 supplies electrical energy to the existing power distribution system through conductors 21 extending to the existing power transmission lines 25.

Figure 5:
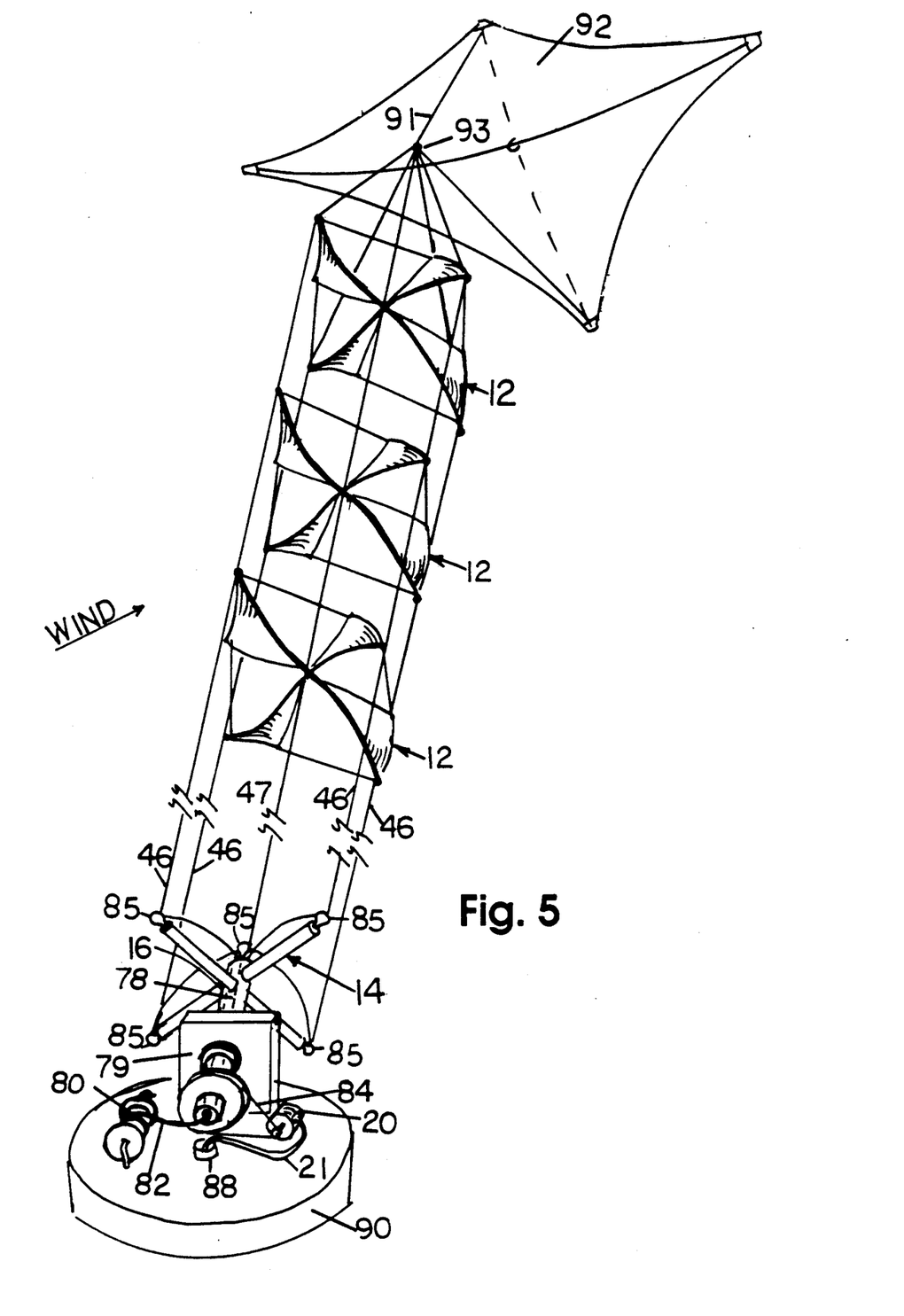
FIG. 5 is a perspective view of a preferred embodiment of my invention utilizing a kite to support and elevate the coaxial generator system.

FIG. 5 shows a perspective view of a preferred embodiment of my invention using a kite to support and elevate the system. Drive shaft 16, stabilizer assembly frames 14, turbine assemblies 12, and coaxial suspender line 47 are all arranged coaxially as shown. Driver lines 46 are attached to the extremities of the stabilizer assemblies 14 and turbine assemblies 12. The attachments of lines 46 and suspender line 47 are shown in more detail in FIG. 4. This coaxial arrangement is supported at its upper end by a pivot attachment 93 to a bridle 91 on a kite 92. Drive shaft 16 is supported in brace and bearing 79. Pulley system 84 is attached between drive shaft 16 and electrical generator 20 which is electrically connected through conductor 21 to some useful electrical application. The four driver lines 46 and the coaxial suspender line 47 feed through tensioners 85 and from the tensioners to a bore 78 in drive shaft 16 to cable reel 80. This entire system is attached to and supported by revolving table 90 which turns around and is supported by axle pipe 88. Axle pipe 88 is hollow allowing for conductors 21 to be fed through it to a useful electrical application.

Figure 6:
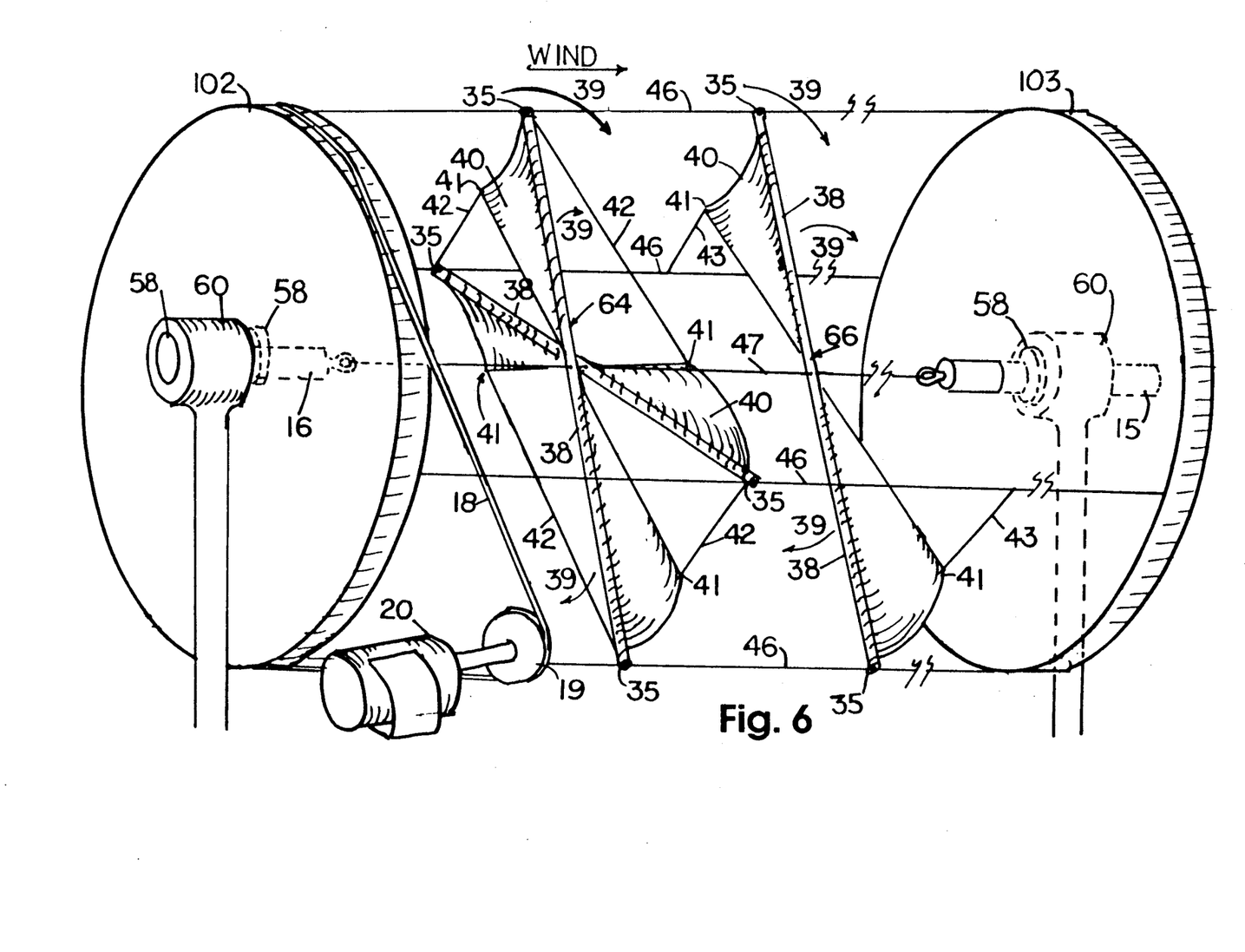
FIG. 6 is a perspective view illustrating alternative construction methods for the power take off arrangement and showing turbine details.

FIG. 6 is a perspective view showing alternative construction for the stabilizer frame assembly and drive shaft arrangement already detailed in FIG. 3. Drive shaft 16, masts 48, guys 50 and guys 52 of FIG. 3 are replaced by wheel shaped hub 102 of FIG. 6. Note that shaft 16 may be an integral part of hub 102. In FIG. 6 hub 102, suspender line 47, turbine 64, turbine 66, and hub 103 are attached coaxially as shown. Driver lines 46 attach to the extremities of hub 102, to the extremities of the turbines and to the extremities of pivot hub 103. Pulley belt 18 runs from hub 102 to pulley wheel 19. Pulley wheel 19 attaches to the drive shaft of electrical generator 20.

FIG. 6 also shows a perspective view of two alternative turbine configurations. Left turbine 64 is constructed by attaching one end of a spar 38 to a driver line 46 at attachment point 35. The other end of this spar 38 is attached to another driver line 46 at another attachment point 35 in such a way that it is substantially perpendicular to both of these parallel driver lines 46 and acts as a separation brace between these two lines. A turbine blade 40 is made of two attached triangles, attached near the center of the spar 38 as shown, and this blade is attached as shown all along the length of the spar 38. One corner of the turbine blade 40 attaches by tether 42 to an adjacent spar 38 at its end point 35. The other corner of the sail 40 is attached by another tether 42 to the other end of the spar 38 at another attachment point 35. The two tethers on this sail 40 pull the two corners 41 that they are attached to, in parallel but opposite directions as shown. The two spars 38 of this turbine 64 are attached near one another at their center points to suspender line 47, and they cross essentially perpendicular to one another. Right turbine 66 is essentially just one half of left turbine 64. But for right turbine 66 the tethers 43 that guy the two corners 41 of the sail 40 in parallel but opposite directions, connect directly to attachment points on separate driver lines 46, not to adjacent spars.

OPERATION OF INVENTION

This invention utilizes light weight wind turbines to convert wind energy into rotational mechanical energy. A multiplicity of these turbines are coupled together coaxially in series by lines attached to their extremities. A central line which is not essential but is very useful may be attached at each of the turbine centers to aid in alignment and suspension. But power is not transmitted by a twisting around a central cord or centroid as suggested in previous art. Power is transmitted to a solid drive shaft through the moment arms of a rigid frame or hub emanating like spokes or like a wheel from the central axis or centered drive shaft. Additionally intermediate driver cables may be attached between the center and the extremities of the turbines to provide additional alignment and support. An example of an intermediate line is shown as line 45 in FIG. 4. The power generated by the turbines is transmitted to a rigid stabilizer frame or hub through the driver lines. The driver lines deliver this power to the frame or hub, not by twisting it at its center but by acting on it at its extremities with a pull through moment arms that causes it to rotate about its center. Hence power is delivered through moment arms not through a central twisting motion. Consequently a substantial flow of power can be delivered to the power take off relative to the size and expense of the coaxial system.

FIG. 2 illustrates one turbine device that can be used for converting wind energy into rotational energy. Wind blowing against this turbine from any direction spills off the turbine blades 40 in the direction of least resistance. Tethers 42 are in practice somewhat elastic in nature allowing them to elongate and allowing wind to spill off the blades 40 away from struts 38. The turbine is rigged so that all blades 40 are tethered in the same direction of rotation, clockwise or counter-clockwise. Hence the turbine will tend to rotate about its center in the direction indicated by directional arrows 39, regardless of wind direction. Attachment hubs 44 and 36 serve as convenient points of attachment for attaching the turbine to driver lines 46 and suspender line 47 shown in FIG. 4.

FIG. 3 illustrates the rigid stabilizer frame which functions as a power take off hub for the system. This coaxial system actually distorts in the wind so each driver line 46 actually contributes a pull in the direction of rotation on the mast 48 where it attaches to that mast. The force of this pull supplies torque to the drive shaft through the moment arm of each mast. Driver lines 46 are stretched parallel to the axis of rotation of the frame and the drive shaft, but they must be attached to the frame some distance from this axis point. This distance is the moment arm of the mast, essential to the dynamics of this system. The length of this moment arm is extremely critical to the sizing and engineering of the rest of this system. Fundamentally the lengthening of this moment arm allows the diameter of the turbines 12 in FIG. 4 to be larger and allows the length of the driver lines 46 in FIG. 4 to be longer. The longer moment arm scales up and improves three dimensional structural stability that resists kinking. This makes it possible to increase the distance between the stationary supports at each end of the coaxial suspension system. It is the choice of the length of this moment arm that makes it possible to engineer the system to generate economical, clean energy. Torque on the moment arm turns drive shaft 16. FIG. 3 shows how the drive shaft 16 is kept in place by the tension in lines 46 and 47 on one side of the stationary support 60 and by thrust bearing 58 on the other side. Power is taken off drive shaft 16 by pulley wheel 17 which turns pulley belt 18. Pulley belt 18 turns pulley wheel 19, which drives generator 20. In practice sizing pulley wheels 17 and 19 is a conenient way to provide the gear reduction needed between the generator and the coaxial wind generator. Pulley wheel 19 is typically much smaller than pulley wheel 17.

FIG. 4 illustrates the coaxial arrangement of the wind generating system. Regardless of wind direction the wind always turns the turbine blades in the direction shown by directional arrows 39. The wind will always spill away from rigid strut 38 towards the corner of turbine blade 40 held by tether 42. Consequently the wind will always drive these turbines in the direction shown by directional arrows 39. The elastic nature of these tether attachments involving blade 40, tether 42, and line 46 enable these turbines to convert wind energy to rotational mechanical energy regardless of wind direction. This feature prevents wind direction from being an operational requirement of the system. This is an important feature since the end points of this coaxial system are typically fixed and the direction of the wind frequently changes.

Wind blows predominately horizontal. So when this coaxial system is suspended horizontally wind may blow perpendicular to the axis of the system, parallel to it, or at any angle in between. In actuality even a so called clean wind is somewhat turbulent and tumbling. So in practical terms the wind never intercepts the entire length of the coaxial system at a perfectly parallel or perfectly perpendicular angle. For this reason it makes more sense to explain the operation of the suspended system in terms of the wind blowing predominantly from one end support or predominantly from the other end support. The wind may be blowing only a few degrees away from being perfectly perpendicular to the axis of the system, but still it will be blowing predominately from, for example in FIG. 4, the power take off end of the system where drive shaft 16 is located. In this case, wind pressure against each turbine blade 40 causes the point of attachment of each tether 42 and the corner of its corresponding blade 40 to move towards pivot shaft 15 and each blade 40 cups into and catches this wind. So even though the wind is almost perpendicular to the axis of rotation the elastic nature of the sails and tethers, and the geometry of the rigging, enable the wind to react with a large cross sectional area of each turbine blade. The wind may shift so that it comes even more from the power take off end of the system, thus the wind blows more parallel to the axis of the coaxial system. When this happens the wind continues to blow into, react with, and turn these same cupped turbine blades.

However the wind may shift the other way off its original, almost perpendicular course and blow almost perpendicular to the axis of the system but predominately from the pivot end of the coaxial system where shaft 15 is located. When this happens, wind pressure on the flexible sails 40 cause the point of attachment of each tether 42 and its corresponding blade 40 to shift towards the power take off end of the system. In nautical terms the turbine blade sails come about. They suddenly cup in the opposite direction. But the turbines continue to rotate in the same direction with little loss of momentum. Even though the turbine sail blades are cupped in the opposite direction the wind still spills off the blades in a direction away from each spar 38 because this is still the flexible path of least resistance. And this continues to drive the turbine assembly 12 in the same, and continues direction of rotation indicated by directional arrows 39. In operation the turbine sails tend to come about, shift back and forth, frequently when the wind continues to blow almost perpendicular to the axis of rotation. All the turbine blades in the system are coupled by driver lines 46 and suspender line 47. This causes the coming about to happen at the same time to all turbine blades in the system. In a very large system this can be rather dramatic. But the system keeps right on working, turning, and converting energy. Due to the elastic nature of the system the members still enjoy a much longer survival life than do conventional rigid wind turbines in spite of this coming about phenomenon. The wind sometimes blows predominately from one end of the coaxial system for a prolonged period, perhaps a day or more. During this entire period the system keeps turning, working and converting energy and it does so without the turbine sail blades doing any coming about at all.

Although it is not shown in the drawings, in practice 50 or more turbines may be suspended between rigid frame or hub assemblies and their corresponding pivot points. Even though each turbine may convert considerable power, the power converted by one turbine is small relative to the power converted by all the turbines. The stress on each line 46 from one turbine to the next is proportional to the torque supplied by one turbine, so that each line 46 may be relatively light. However the power delivered to the rigid stabilizer frame and power take off device 14 by the closest turbine is a function of the torque generated by all the turbines. The sizing of this part of line 46 should take this fact into account. Line 47 is not a mechanical power transmission line. Line 47 has zero moment arm relative to the drive shaft 16. However intermediate driver lines like driver line 45, can be added by attachment to masts (48) and spars 38 at any interval between the center of the spars and their end points 44. Lines like intermediate line 45 can be attached to spars 38 and masts 48 as needed depending on the size, expected wind speeds and the engineering of the system. It is the support provided by lines like intermediate line 45 and driver lines 46 that solves the size limitation problem that exists for turbine blades that emanate from a central hub without support. Intermediate lines can be used as a web of support for the turbines and power take off frames and can provide a light weight, inexpensive technique for greatly increasing the size and torque of each turbine and the system.

In operation this coaxial system sags between frames 14 and it distorts with its center being blown in the prevailing direction of the wind. The system operates with a spiral twist in it. The turbine farthermost from the power take off hub leads all the others. Each turbine in turn proceeding towards the power take off hub lags its predecessor. This turns out not to be a problem. This distortion is actually the source of the pulling force that causes the frames 14 of FIG. 1 and FIG. 5 to impart torque to the drive shaft. Additionally it is found that wind and gravity hold the coaxial system in this curvature and allow it to continue to rotate and produce power along this curved and spiral axis without structural damage or undulation. Early systems did self-destruct but systems constructed as here illustrated survived all winds experienced on a more or less continuous basis with minor maintenance required. In practice there are advantages in providing elastic driver links 49 where line 46 attaches to mast 48. These links 49 may be constructed from, for example, multiple strands of heavy bungy cord. If center line 47 is non-elastic but lines 46 have elastic links 49 as shown then the turbines will tend to distort in a specific way in the wind. The extremities of the turbines dish away from the center in the predominant direction of wind flow. This is true whether the wind is blowing predominantly from the drive shaft end of the coaxial system or predominantly from the pivot end. The wind contours the turbines into a dish shape. And an unexpected bonus of the system is that the turbines contoured into this natural dish shape are (up to a point) more efficient at converting wind energy into rotational mechanical energy than are the flatter turbines. Past that point the dish shaped turbines spill more wind than they convert. This turns out actually to be another advantage. This sets an upper limit to the amount of energy the power generator and power take off have to handle. Thus elastic driver links 49 are of double value.

FIG. 1 shows a perspective view of a preferred embodiment of my invention where existing transmission lines are used to support and elevate the coaxial wind generator system. Intermediate supports 31 are employed to support the system at each intermediate tower. Frames 14 must be provided on either side of intermediate support 31 because power must be transmitted through a secondary rotating shaft 15 as it cannot be transmitted through driver lines 46. Lines 46 must be discontinuous at fixed supports 26. This embodiment functions as described for the embodiment in FIG. 4 above, and in this application the generator 20 supplies power directly to the existing power distribution system by transmitting power via conductors 21 to transformer/inverter 22 which supplies power through additional conductors 21 to the existing power transmission lines 25.

FIG. 5 shows a preferred embodiment of my invention using a kite 92 having bridle 91 to elevate and support the pivot end 93 of the coaxial generator system. This embodiment functions as described for the embodiment in FIG. 4. above. Here the entire system is attached to and supported by rotating table 90 which allows the kite to change direction with changes in the direction of the wind. Electrical power conductors 21 feed through the axle pipe 88 at the center of the rotating table. In this way the table can be supported below and conductors 21 can feed out the bottom of the pipe 88. Reel 80 is used to adjust the length in lines 46 and 47. The bundle of lines 82 feed through a bore 78 at the center of drive shaft 16 to tensioners 85 and from there up into the coaxial system.

FIG. 6 is a perspective view of an alternative way this coaxial generating system works. As already mentioned pulley wheel 17 of FIG. 3 typically needs to be much larger than pulley wheel 19. Wheel shaped power take off hub 102 in FIG. 6 is used in place of pulley wheel 17, drive shaft 16, masts 48, guys 50 and guys 52 in FIG. 3. FIG. 6 shows hub 102 functioning as the attachment point for driver lines 46, and suspender line 47, functioning as the moment arm for power delivered by the driver lines, and functioning as the pulley wheel useful in establishing the desired gear ratio between the coaxial generating system and the electrical generator 20. Wind causes turbines 64 and 66 (together with all the other turbines in the system implied by the cut marks) to rotate. This rotational energy is transmitted to hub 102 by driver lines 46 as described above. Hub 102 transmits power to pulley wheel 19 through pulley belt 18, and pulley wheel 19 transmits rotational energy to electrical generator 20. Hub 102 is supported so that it is free to rotate about its center axis by shaft 16. Shaft 16 is supported by stationary support 60 and held in place by tension in suspension line 47 on the right side of stationary support 60 and by thrust bearing 58 on the left side of stationary support 60. Hub 102 is held in place by thrust bearing 58 on the right side of stationary support 60 and by support 60 itself. Hub 103 serves as the point of attachment for lines 46 and 47 and as the pivot at the end of this coaxial generating system. Hub 103 and shaft 15 are held in place by tension from lines 46 and 47 and by thrust bearings in a manner similar to hub 102.

FIG. 6 also shows two configurations of the turbines used to power this coaxial generating system. Left turbine 64 functions much like the turbine illustrated in FIG. 2. FIG. 6 shows that it is not necessary for the two spars 38 to attach at a central hub. They may attach separately to suspender line 47 at their centers or simply attach to nothing at their centers. They still work well as turbines to power this system. Wind spills off the turbine blades at their corners 41 causing the turbine 64 to rotate about its centers in the direction indicated by directional arrows 39. The right turbine 66 illustrates how a turbine having only one spar works in this system. Tethers 43 attach to the corners 41 of turbine blade 40, and these tethers 43 tether these corners in parallel but opposite direction as shown in FIG. 6. Turbine blade 40 of turbine 66 is tethered in parallel but opposite directions on opposite ends of the spar 38. Thus wind causes turbine 66 to rotate in the direction indicated by the directional arrows 39.

Left turbine 64 in FIG. 6 consists of a pair of turbines like right turbine 66. Here the pair of 66 type turbines are attached in approximately the same plane into the suspended coaxial turbine system. The respective spars 38 of each of this pair of turbines are attached in this case into the system perpendicular to one another. Each end point 35 of the spars 38 in left turbine 64 is attached to a driver line 46 and it is also tethered to the corner of a sail 40. FIG. 6 is meant in part to show that it is convenient to attach type 66 turbines in pairs to have a rigid place to tether each sail 40. But FIG. 6 also shows, by way of right turbine 66 that it is by no means necessary to attach type 66 turbines into the system in pairs to form type 64 turbines. Turbine 66 functions perfectly well on its own. In practice the coaxial turbine system functions if all the turbines attached and suspended in the system are like left turbine 64, or if all the turbines are like turbine 12 of FIG. 2, or if turbines 64, turbines 66, and turbine 12 are mixed in the system. The important thing is that all turbines are rigged to turn clockwise or all turbines are rigged to turn counterclockwise. Right turbine 66 is the basic turbine unit used as the power conversion unit for this invention. A multiplicity of these turbine units 66 can be centrally attached to a single hub as in turbine 12 of FIG. 2.

A multiplicity of these turbine units 66 can be attached and suspended in the system near enough to one another that they facilitate common attachment points for tethering as in left turbine 64, or a multiplicity of turbine units 66 can be attached between of driver lines 46 in a plane perpendicular to these driver lines where none of the turbine units 66 actually attach directly to one another. The apparatus of FIG. 1 is shown operating with a multiplicity of turbines such as turbine 12 of FIG. 2. The apparatus of FIG. 1 will however operate with a multiplicity of turbines such as left turbine 64, with a multiplicity of right turbines 66 or with a combination of any or all of these three different turbine types; type 12, type 64 and type 66.

CONCLUSION

This coaxial generator system employs a unique combination of features. It utilizes a multiplicity of coaxial turbines. It has a durable suspension support system. And it transmits the power generated by this multiplicity of turbines through a moment arm mechanism to a single location where mechanical energy can be economically converted to electrical energy or put to some other useful purpose. This invention fills the need for clean, economical energy provided by an easy to construct durable system that has proven itself to work well in a wide range of wind velocities and weather conditions.

While the above description contains many specifics, these should not be construed as limitations on the scope of the invention, but rather as an exemplification of the preferred embodiments thereof. Many other variations are possible. Various turbine means can be integrated into this invention to deliver power to the take off through this unique movement arm concept. This coaxial system can be suspended between buildings, between mountains, between a tower and the ground, and in virtually any space where the wind blows. Additionally, wind is not the only moving fluid that can be used to power this coaxial generator system. Water current is readily available as another source of power. Accordingly, the scope of this invention should be determined not by the embodiments illustrated, but by the appended claims and their legal equivalents.

I claim:

1. A generator system including an assembly comprising:
   a) a hub structure,
   b) a plurality of substantially parallel lines having oppositely disposed ends,
   c) a pivot means,
   d) a plurality of turbine means, and
   e) a plurality support means,
where the hub structure is attached to a hub support means so as to support and align the hub to rotate on an axis, the parallel lines attach to the hub at points spaced around the extremities of the hub, and the parallel lines emanate from the hub through a gap between the hub and the pivot means, the parallel lines are separated but substantially parallel to one another, and separated from but substantially parallel to the axis of rotation of the hub, the oppositely disposed ends of these lines attach to the pivot means, the pivot means is attached to a pivot support means so as to support and align the pivot means to rotate with its axis of rotation substantially aligned with the axis of rotation of the hub, and the extremities of each of the plurality of turbine means are attached in the gap between the hub and the pivot to the parallel lines, the axis of rotation of each turbine is substantially aligned with the axis of rotation of the hub and pivot, whereby the parallel lines on the extremities of the hub and the turbine means transmit the energy generated from fluid flow by the turbines to the hub, and the hub is thereby available as a source for the take off of useful energy.

2. The generator system assembly of claim 1 further including a suspender line having oppositely disposed ends with one end of the suspender line attached to the hub at a point on the hub's axis of rotation, where the suspender line is aligned with the axis of rotation of the hub and emanates to a point of attachment on the axis of rotation of the pivot, and where each of the turbine means is attached at its axis of rotation to the suspender line.

3. The generator system assembly of claim 1 further including a plurality of additional lines having oppositely disposed ends where one end of each line is attached to a point on the hub intermediate to the extremities of the hub and the axis of rotation of the hub, where these lines emanate from the hub, separated from but substantially parallel to the axis of rotation of the hub, to points of attachment on the turbine means and on the pivot.

4. The generator system assembly of claim 1 wherein the pivot is a second hub structure.

5. The generator system assembly of claim 4 wherein a plurality of generator assemblies are linked together coaxially in series, further including a link between each of the generator assemblies comprising a substantially rigid link shaft aligned to turn coaxially with the hubs on the generator assemblies and where each of these link shafts is secured by thrust bearings, and each shaft is supported and aligned by additional support means.

6. The generator system assembly of claim 5 wherein the plurality of support means are selected from the group consisting of power transmission towers, power and telephone poles, mountains, cliffs, other points of natural elevation, trees, buildings, and combinations thereof, and further including extension means used to keep the apparatus separated from power transmission lines, trees, and other points of elevation.

7. The generator system assemblies of claim 5 wherein the fluid flow that is converted into rotational energy by the assembly is provided by the movement of a fluid selected from the group consisting of air and water.

8. The generator system assembly of claim 1 wherein each of the lines are linked to the hub and to the pivot by lengths of elastic line.

9. The generator system assembly of claim 1 wherein the support means for the pivot is an aerodynamic lifting body, and where the support means for said hub structure is a rotatable platform.

10. The generator system assembly of claim 9 wherein the aerodynamic lifting body is a kite.

11. The generator system assembly of claim 1 wherein one or more of the plurality of turbine means is a sail turbine unit which comprises in combination:
   a) a substantially rigid spar having a top half and a bottom half and having oppositely disposed ends, b) a turbine blade of a piece of flexible material, and
c) a first and second tether means, where the spar attaches at one of its ends to one of the parallel lines and at its opposite end to another of the parallel lines, where these two parallel lines attach to the hub at positions substantially 180 degrees apart across the diameter of the hub, where the spar is substantially perpendicular to both of these parallel lines, where part of the turbine blade is attached along the top half of the spar and part of the turbine blade is attached along the bottom half of the spar, where that part of the turbine blade attached to the top half of the spar is attached by the first tether means to a parallel line emanating from the hub, where that part of the turbine blade below the center of the spar is attached by the second tether means to another of the parallel lines emanating from the hub, and where the tether means pull the two parts of the turbine blade in substantially parallel but substantially opposite directions in a plane substantially perpendicular to the parallel lines.

12. The generator system assembly of claim 11 further including a suspender line emanating coaxially from an attachment point on the axis of rotation of the hub to an attachment point on the axis of rotation of the pivot, where the center of the spar of the sail turbine unit attaches to the suspender line.

13. The generator system assembly of claim 23 wherein two of said sail turbine units are attached to the parallel lines, where these two sail turbine units are attached substantially in the same plane to form a composite sail turbine, said composite sail turbine being formed by having each end of the spars of the two sail turbine units tethered by the first and second tether means to the adjacent turbine blades of the other sail turbine unit, and where a plurality of these composite sail turbines are attached to the parallel lines between the hub and the pivot.

14. The generator system assembly of claim 13 further including a suspender line emanating coaxially from a point of attachment on the axis of rotation of the hub to a point of attachment on the axis of rotation of the pivot, where the center of the spars of each of the composite sail turbines attach to the suspender line.

15. A generator system including an assembly comprising
a) a spar having two oppositely disposed ends, a top half and a bottom half, and
b) a turbine blade of a piece of substantially flexible material, and
c) a first and second support means, where one edge of the turbine blade is attached along the spar, part of this edge being attached along the top half of the spar and part of this edge being attached along the bottom half of the spar, where that part of the turbine blade attached to the top half of the spar is attached to and held away from the spar by the first support means, where that part of the turbine blade attached to the bottom half of the spar is attached to and held away from the spar by the second support means, where that part of the turbine blade attached to the top half of the spar, and that part of the turbine blade attached to the bottom half of the spar are held away from the spar in substantially parallel but substantially opposite directions by the first and second support means, whereby the turbine blade is spread out substantially into a plane and pressure normal to this plane acting in the same direction at the same time against the top and the bottom parts of the turbine blade impart a rotational torque on the spar, whereby the assembly is arranged to function as a turbine.

16. The generator system assembly of claim 15 wherein the flexible material of the turbine blade is substantially in the shape of two triangles where one edge of the first triangle is attached to the top half of the spar and one edge of the second triangle is attached to the bottom half of the spar, where the corner on both the first and the second triangle that is opposite the edge attached to the spar is tethered and held away from the spar by tethering to the support means, and where the first and second triangles are tethered in substantially parallel but substantially opposite directions by the support means.

17. The generator system assembly of claim 15 which further includes a suspender line with the center of the spar stabilized by attachment to the suspender line.

18. The generator system assembly of claim 15 wherein a plurality of assemblies are substantially concentric in substantially the same plane, and including means to tether the ends of the spars of each of the assemblies to adjacent turbine blades, whereby the plurality of assemblies is interconnected as one composite turbine.

19. The generator system assembly of claim 18 further including hub means attaching the center of the spars of the composite turbine for stabilization.

20. The generator system assembly of claim 18 wherein a multiplicity of the composite turbines are lined up in a column, each turbine substantially coaxial to the other turbines relative to their axis of rotation, further including a plurality of parallel lines running substantially parallel to the axis of rotation of the turbines and attached to the ends of the turbine spars, further including a hub structure where these parallel lines attach to the extremities of the hub structure at one end of the column and further including a pivot means for attachment of the other ends of the parallel lines at the other end of the column, and further including a suspender line emanating from a point of attachment on the axis of rotation of the hub to a point of attachment on the axis of rotation of the pivot where this suspender line attaches to the axis of rotation of the turbines, and further including support means stabilizing the hub and the pivot in coaxial alignment.

* * * * *